United States Patent [19]

Michael et al.

[11] 4,240,106

[45] Dec. 16, 1980

[54] VIDEO NOISE REDUCTION

[75] Inventors: Peter C. Michael, Newbury; Richard J. Taylor, London; Martin R. Trump, Newbury, all of England

[73] Assignee: Micro Consultants, Limited, Berkshire, England

[21] Appl. No.: 15,989

[22] Filed: Feb. 27, 1979

Related U.S. Application Data

[63] Continuation-in-part of Ser. No. 841,519, Oct. 12, 1977, Pat. No. 4,163,249.

[30] Foreign Application Priority Data

| Oct. 14, 1976 | [GB] | United Kingdom | 42751/76 |
| Jul. 26, 1977 | [GB] | United Kingdom | 31356/77 |
| Jul. 26, 1977 | [GB] | United Kingdom | 31357/77 |
| Jul. 26, 1977 | [GB] | United Kingdom | 31358/77 |
| Sep. 14, 1978 | [GB] | United Kingdom | 36838/78 |

[51] Int. Cl.³ .......................................... H04N 9/535
[52] U.S. Cl. ....................................... 358/36; 358/167
[58] Field of Search .......................... 358/167, 105, 36

[56] References Cited

U.S. PATENT DOCUMENTS

| 4,064,530 | 12/1977 | Kaiser et al. | 358/167 |
| 4,090,221 | 5/1978 | Conner | 358/105 |

Primary Examiner—Richard Murray
Attorney, Agent, or Firm—Dowell & Dowell

[57] ABSTRACT

A video noise reduction system including a coefficient modifier for modifying at least a portion of the incoming video information. Video storage is provided to store the modified information and an adder is provided for adding at least a portion of incoming picture information with at least a portion from a corresponding stored picture point from an earlier field. The noise reduced picture information is provided at the store output. The degree of noise reduction may be varied in dependence on movement detected between fields and whether luminance or chrominance components are present.

31 Claims, 25 Drawing Figures 4,240,106

VIDEO NOISE REDUCTION

This is a continuation-in-part application to Ser. No. 841,519 filed Oct. 12, 1977; now U.S. Pat. No. 4,163,249.

BACKGROUND TO THE INVENTION

The invention relates to video noise reduction. Noise reduction schemes are concerned with the integration of video data to reduce the effect of noise contained therein.

SUMMARY OF THE INVENTION

According to the invention there is provided a video noise reduction system for incoming video information derived from a plurality of picture points, said system comprising coefficient modifier means for modifying at least a portion of the incoming picture point information, video storage means for storing the modified picture point information, and adder means for adding at least a portion of the stored picture point information to at least a portion of corresponding picture point information from an incoming field to provide noise reduced picture point information at the store output.

Further according to the invention there is provided a method of reducing noise contained in video picture point information comprising modifying at least a portion of the incoming information, storing the video information and adding at least a portion of the stored information to the incoming information to provide a reduction in the noise after said adding step.

BRIEF DESCRIPTION OF THE DRAWINGS

The invention will now be described by way of example with reference to the accompanying drawings in which.

DESCRIPTION OF PREFERRED EMBODIMENTS

Figure 1:
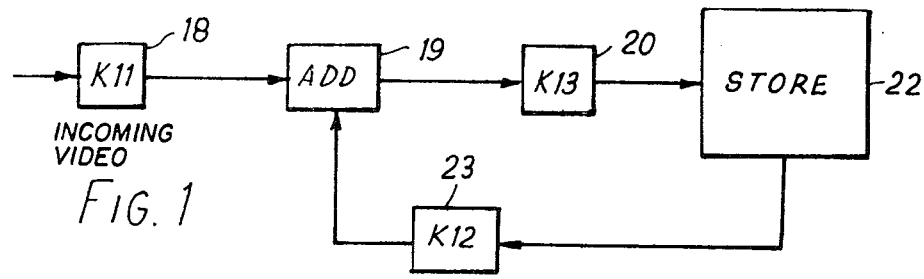
FIG. 1 shows an arrangement for a noise reduction system.

FIG. 1 shows an arrangement for providing a noise reduction system. An incoming video signal (e.g. NTSC 525 line standard T.V. signal) is applied to coefficient modifier 18. If the signal is normal composite video, the chrominance and luminance components will have been separated and the analogue information converted into digital form for application to the modifier 18. Such analogue to digital conversion of T.V. signals is well known.

The output of coefficient modifier 18 is received by an adder 19 which also receives a stored video signal received from store 22 via a further coefficient modifier 23. The output of the adder is entered into the store 22 having been first modified in a further modifier 20. The output of the store is thus comprised of a portion of the incoming video data to which a portion of the stored data has been added. This has the effect of reducing noise which tends to be of a random nature.

The system shown in FIG. 1 will now be described in more detail with reference to FIG. 2. The T.V. picture can be considered as comprising a number of picture points which picture point information has been converted into digital form suitable for storage in the video store 22.

The analogue to digital conversion produces a digital data stream M bits wide. In the system described herein M is selected to lie between 8 and 10 bits. 8 bits is sufficient to convey all analogue input information without significant signal degradation.

The M bit wide digital data (say 8 bits) is applied to the noise reduction input coefficient modifier 18 of system 6 and this unit modifies it by a factor designated K11. The output from coefficient modifier 18 is applied to one input of the M bit wide adder 19. The output of the adder 19 is Q bits wide and applied to coefficient modifier 20 which accepts the input from the adder, modifies it by a coefficient K13 and provides the output Q bits wide available for the input port 1 of data store 22 within store unit 3.

Port 2 of data store 22 is arranged to read data from the data store and apply it to coefficient modifier 23. Modifier 23 accepts the information from the data store, modifies it by coefficient K12 and applies it to the other side of the Q bits wide adder 19.

In the system under consideration the resolution of the data store is Q bits wide where Q lies between 10 and 12.

The output data from port 3 of the data store 22 is R bits wide where R lies between 8 and 10. The system is capable of operating without any signal degradation at 8 bits wide and signal enhancement may be utilised so that 10 bit data is available to provide a significant noise reduction.

Thus the general principle of noise reduction is achieved by re-circulating the video data to which a portion of the new incoming data is added and a portion of the total removed for each store location. The system may be likened to an integrator with leakage. In a simple system the values of coefficients K11, K12 and K13 would be fixed so that effectively fixed portions of the stored and incoming data would be selected. Whilst this selection of the coefficient will suffice for a particular picture condition, such as when the entire picture content is stationary (e.g. in a T.V. test card) in practice the values of the coefficients will have to be varied to accommodate picture movement to avoid producing smearing of the final picture for example. A set coefficients unit 25 is thus shown to provide the various coefficient values to be used in the modifiers.

The set coefficient unit 25 provides the coefficients in dependence on the degree of noise reduction required shown in this example as determined by control 43 which accesses the data store 41 via the ADC 42.

The set coefficient unit may also provide variation of selected coefficients by detecting any picture movement occurring, and is shown receiving incoming and stored data.

The set coefficients unit 25 examines the data from the input and from the output port 2 of data store 22 in an area comparison system for example to detect movement as described in more detail below. The result of the comparison of information modifies the coefficients on a point by point basis in real time.

Figure 3:
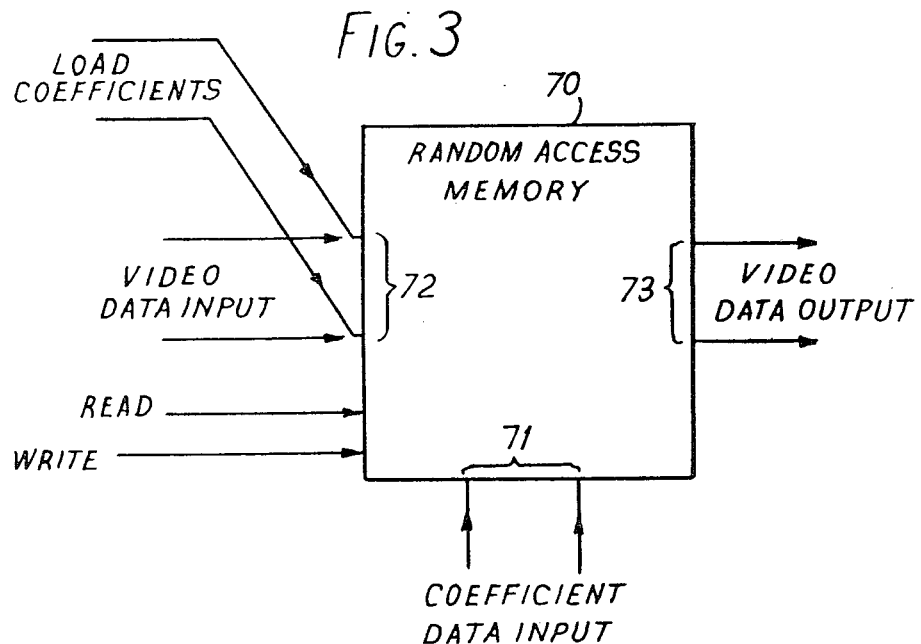
FIG. 3 shows a random access memory suitable for use as a multiplier in the system of FIG. 2.

Coefficient modifiers 18, 20 and 23 each include a multiplier operating in real time. A method which can be used is a look-up table and a way in which this is achieved is shown in FIG. 3. The input data is applied to RAM 70 within modifier 18 which has sufficient addresses so that each input number identifies one particular location in the store. A suitable random access memory (RAM) would have a capacity of 8×256 bits for example and such memories and their mode of operation are well known in digital processing.

The coefficients are loaded into the store locations within the RAM during a write cycle. The coefficient data is applied to the RAM data input 71. The location to which data is written in is determined by store address data input 72. Address data is applied in the normal way to the address input 72 to input the coefficient data at input 71. The addressing data is shown as 'load coefficients'. During operation as a multiplier (i.e. read cycle) the incoming video data is applied to the RAM 'address' terminals 72. The RAM has sufficient addresses so that each input number identifies one particular location within the store. Thus as each location has a preloaded coefficient stored therein when a particular location is accessed (i.e. in dependence on the incoming data which effectively defines the address), the data stored in a particular location is read out from the RAM at output 73. This data will either be an 0 or 1 depending on the predetermined coefficient. Thus the 8 bit input data for a particular picture point will effectively be multiplied by a coefficient K11.

Similar RAMs would be used for modifiers 20 and 23 and selected to have the desired bit capacity to provide a look-up system.

The output from coefficient modifier 18 is applied to one side of the M bit×Q bit wide adder 19. Standard arithemetic elements are used for the adder 19.

The data store 22 has three data ports 1, 2 and 3. Port 1 allows data to be written into the store, port 2 allows data to be read from the store at a location corresponding to port 1 and port 3 allows data to be read from the store at another location. In principle the three ports run asynchronously. The data store may take the form of a system described in British patent application No. 6585/76 (U.S. patent application Ser. No. 764,148). The store is large enough to store at least one complete television frame of Y, I and Q information at full bandwidth (5-6 M bits).

The store 3 will have an associated store control which includes address counters for addressing the various memory addresses within the frame store for a read or write cycle and timing control for producing timing signals for addressing the memory elements at the correct point in time, in known manner and as explained in detail in the above referenced patent application. The store itself may be constructed from known 64×64 bit memory chips (i.e. 4096 by 1 RAM) which bit locations are accessed by entering row and column address information from the store control as an 18 bit address derived from picture point counters. As the 4096 random access memory chip is dynamic, a refresh cycle must also be effected to retain the stored data. Refresh address counters are therefore included. For example, a store using 16 cards each containing 32 RAM chips would provide a framestore of 256×512 words 8 bits wide to allow 512 video lines each of 512 picture points to be stored.

The storage capacity could be expanded as required.

The system output is taken from the store output so that the data passing through the system effectively experiences zero delay because the storage time together with the system processing is selected to be an integral number of fields or frames between system input and output. In the three port store system one output is used to provide the fed back information and the other output is used to provide the noise reduced data. The output data is R bits wide where R is equal to or greater than M bits for noise reduction.

The limit to the noise reduction which is not limited by systematic errors is dependent on the capacity of the data store. In the system under discussion, with suitable storage, 16 complete frames of information may be stored an integrated before the store overflows using:

M=8
Q=12

At this level of integration a reasonable value for R is:
R=10

When considering a typical T.V. picture, the picture information contains a large amount of stationary data during which high noise reduction coefficients may be applied. The nature of the noise may be random and the larger the integration time in the data store, the greater the reduction in noise.

Coefficient K12 controls the amount of output data fed back and restored.

Coefficient K13 controls the amount of data which is removed during each store cycle. Coefficient K11 is provided to prevent the system overflowing and exceeding the store capacity.

If the incoming video information is stationary—for example a test card transmission—coefficients k11, k12 and k13 may be set to a value for optimum noise reduction. Typical examples of the coefficients under these conditions are:

k11=0.125
k12=0.875
k13=1.0

If the total picture is moving, for example during the "pan" of a camera then the coefficients k11, k12 and k13 may require setting at values shown below if movement portrayal is not to be distorted by the effect of the noise reduction system. Typical coefficients under camera pan operations are:

k11=0.875
k12=0.125
k13=1.0

During the above two examples it would be possible to take picture level movement measurement as mentioned above and apply that to fix the coefficients k11, k12 and k13 for the total frame period. If part of the picture is stationary whilst part remains moving in order to obtain effective noise reduction over the stationary part of the picture whilst allowing movement portrayal without distortion, it becomes necessary to modify k11, k12 and k13 on a picture point by picture point basis.

This goes beyond the simpler step described above which requires a setting of the coefficients k11, k12 and k13 on a fixed basis. The first step towards a more effective coefficient modification system which adapts to picture movement is the comparison of changes which have occurred between successive data values stored at the same picture location in sequential pictures. To provide effective control of the coefficients selected a movement detector is required. Several movement detector mechanisms will now be described which are the subject of British patent application Ser. No. 31357/77.

Figure 4:
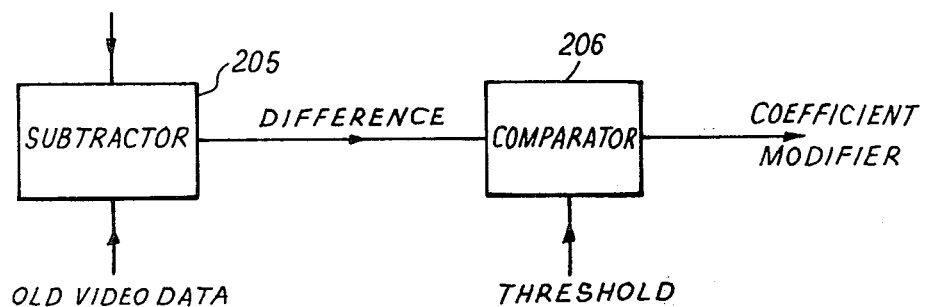
FIG. 4 shows an arrangement for movement detection.

A simple movement detector is shown in FIG. 4 and comprises a subtractor 205 and comparator 206.

Each picture point in a new picture is subtracted from the data previously stored at the same location and the difference signal is applied to a comparator. The movement detector could be incorporated within the set coefficients unit which receives new and previously stored picture data. If the difference signal exceeds a threshold level the picture is deemed to have moved and coefficients k11, k12 and k13 are switched to levels which would be appropriate for movement. Whilst the change remains within the threshold level coefficients suitable for noise reduction of still images are utilised.

It has been found however that adjustment to threshold levels and coefficient settings are required if the system is to operate satisfactorily.

Figure 5:
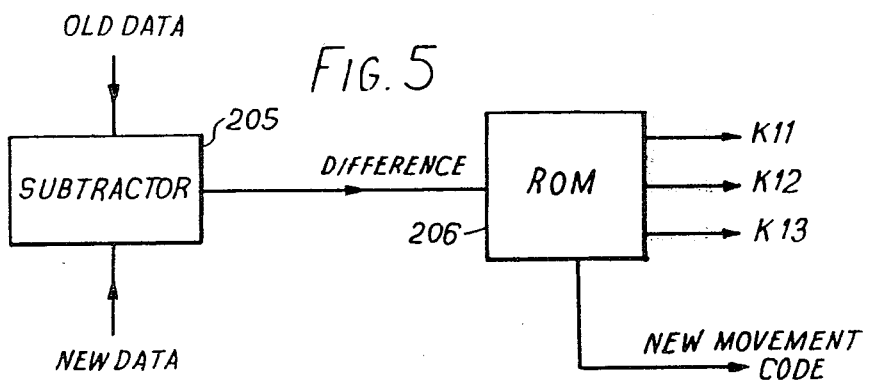
FIG. 5 shows an alternative detector with multilevel coefficient generation together with a movement code.

To overcome this problem an alternative arrangement for the movement detector which may be incorporated in set coefficient unit 25 is shown in FIG. 5.

A read only memory (ROM) 206 is provided in place of the comparator and a subtractor 205 is used in a similar manner to the earlier arrangement. The mode of operation of a ROM and construction thereof is well known. The difference signal is now used to address read only memory which contains various coefficients of k11, k12 and k13 in fixed storage locations. Large movements are differentiated from small movements and a sliding scale of coefficients k11, k12 and k13 is provided on a real time basis. A movement code may also be made available to be stored with the video data in the data store 22. The way in which this movement code is generated will be described below.

Figure 6:
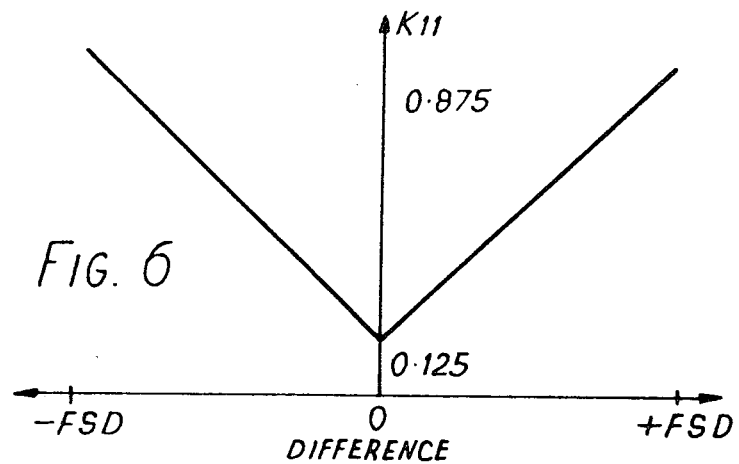
FIG. 6 shows a graph of stored coefficients K11 which are selected in dependence on measured differences.

FIG. 6 shows a typical example of the coefficient k11 as stored in the ROM. The graph is shown against two axis. The difference signal is the horizontal axis whilst k11 is the vertical axis. If there is zero difference between old data and new data k11 is set to 0.125. If there is a full scale difference of either polarity between old data and new data k11 is set to 0.875.

Any value of the difference measured lying between zero and full scale will give a corresponding value of k11 from the graph.

Figure 7:
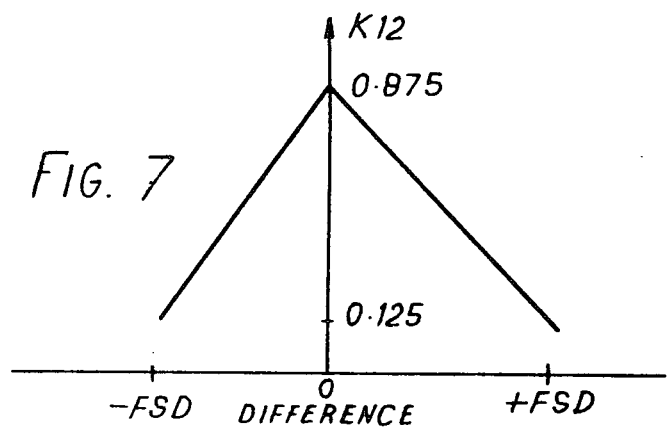
FIG. 7 shows a graph of coefficients for K12.

The same difference signal produced by subtractor 205 is used within the ROM to calculate the value of k12 as shown in FIG. 7. If there is zero difference between old data and new data k12 is set at 0.875.

If there is a difference signal between old data and new data approaching full scale k12 is set to 0.125. Between the two extremes a sliding scale for values of k11 and k12 is chosen. The settings for k13 could be similarly effected.

Figure 8:
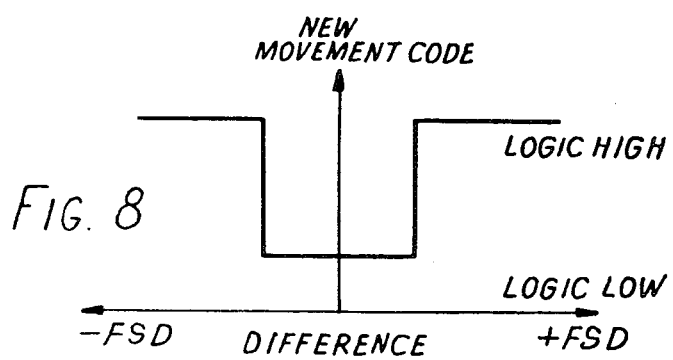
FIG. 8 shows a suitable movement code provided at the output of the ROM of FIG. 5.

As mentioned concerning the ROM 206 of FIG. 5 the system can also provide movement information in the form of a movement code. This is provided by a single data bit available as a function of the difference signal and stored in the read only memory. FIG. 8 shows the movement code to be applied to the volume processor. The transfer function is similar to the simple comparator and threshold mechanism. Provided that the difference does not exceed a given threshold value the movement code remains at a logical low. If the difference signal exceeds the threshold value the movement code becomes logical high. No intermediate values are permitted between logical low and logical high. In practice it has been found that the threshold for movement coding may be set to a fixed level to cover all input signal variations.

The movement code bit derived from the mechanism just described is stored together with the video data in the store 22 as before. One of the bits in each location is allocated to storing the movement code. The movement code could be expanded to two bits for example to indicate the degree of movement detected.

Figure 9:
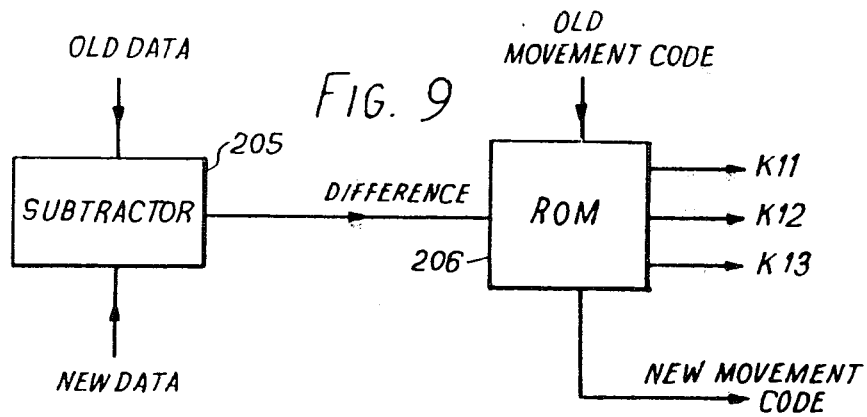
FIG. 9 shows an alternative coefficient setting system using the movement code from previous data.

The code may be utilised to provide more intelligent adaptive control of the noise reduction system. At the same time that the video data is retrieved from port 2 the old movement code is extracted and applied to the ROM. Two different coefficient curves for K11 are stored in the ROM and are accessed in dependence upon the value of the old movement code. This ensures that the scene has been stationary for two frame periods before applying the heavier noise reduction coefficients. Such an arrangement is shown in FIG. 9. ROM 206 receives the difference signal and the old movement code and produces the settings for k11, k12 and k13 together with the new movement code.

Figure 10:
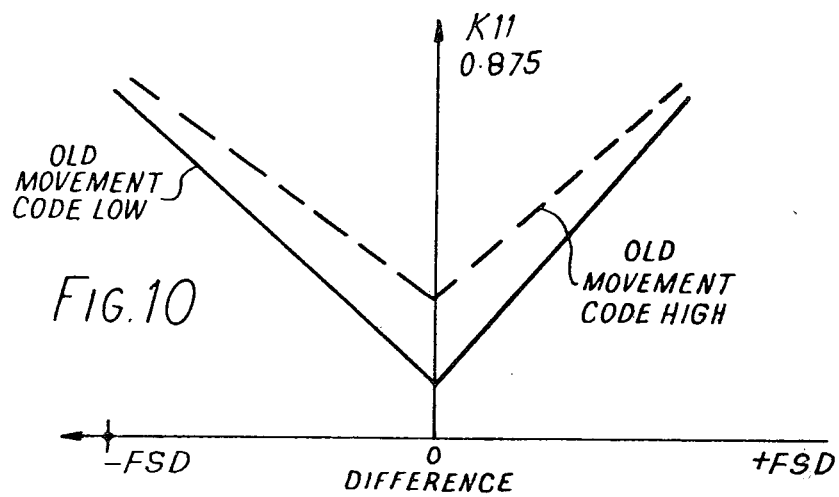
FIG. 10 shows graphs for K11 dependent on the movement code.

FIG. 10 shows the two different curves for k11. The upper curve shows when old movement curve is high and the lower curve when the old movement curve is low. In a similar way curves are stored for two different coefficients of k12 and k13.

The description so far is for an adaptive system which can change on a point to point basis and is generally controlled by a point to point comparison. As discussed earlier, a number of effects may give rise to a change in coefficient and not all the effects are due to movement.

For example, impulsive noise or tape recorder noise may also give rise to a different signal which is interpreted as movement. The descriptions which follow offer several mechanisms which distinguish between true movement and noise.

Figure 11:
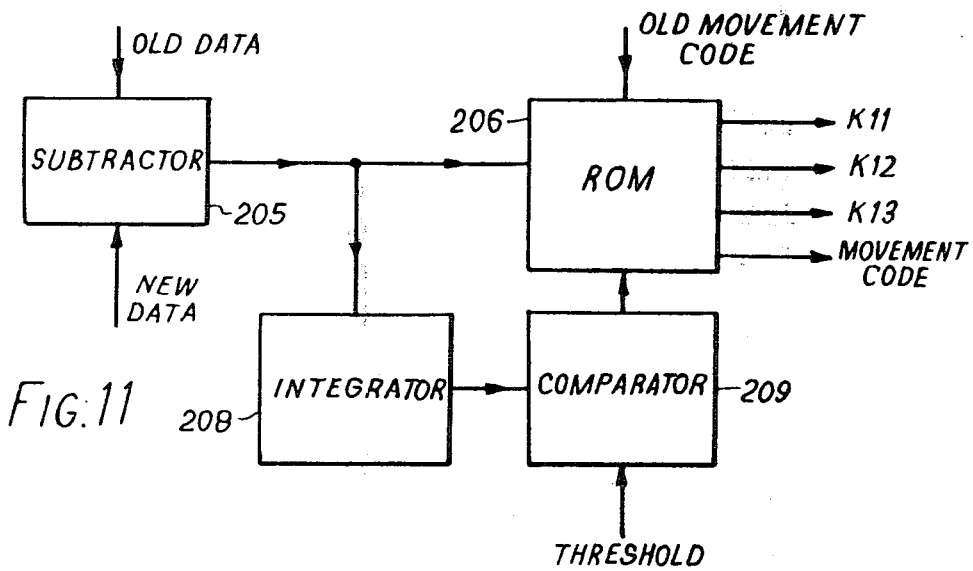
FIG. 11 shows an alternative movement detector including integration for detecting movement in the presence of noise.
Figure 12:
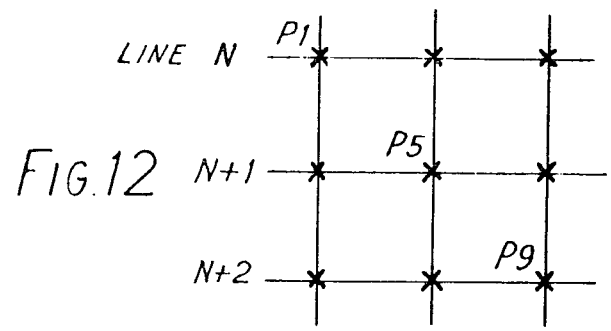
FIG. 12 shows an area voting scheme for movement detection.

FIG. 11 shows a system which incorporates a digital integrator. The subtractor 205 accepts old and new data as before and the difference is passed to ROM 206. The old movement code is received by the ROM. An integrator 208 also receives the difference signal from subtractor 205 and the integrator output is received by a comparator 209 which compares this signal with a threshold level and the comparator output is connected to an input of the ROM. The integrator accepts the difference signal and produces an average value over a given period of time longer than a picture point interval. Provided that the noise is of a statistical nature, the digital integrator will generally sit with a value close to zero. Movement on the other hand will cause the integrator level to rise. The comparator and threshold system is applied to the output of the integrator and used to produce another signal which may be applied to the ROM. The ROM will have in addition to the two stored curves for k11 which are selected by the movement code described above, two further curves for k11 which are selected in dependence on the comparator output. The integration time may be selected as a part of a line, a full line, several lines or a complete field. In practice, a selection of several lines have been found to be a suitable value to differentiate effectively between true movement and noise. The subtraction between old video data and new video data has been described on a single picture point basis. It has been found however that a more effective method of determining the difference between noise and true movement may be made if an area of picture is examined. FIG. 12 shows the area examination system. In the example given 9 picture points are arranged in the form of a square with a single picture point in the centre. To determine the total difference at picture point P5 a contribution from all surrounding picture points is made. The system has a particular advantage in a colour television system utilising NTSC or PAL colour subcarrier. Utilising the arrangement shown for area movement detection the system may be made insensitive to residual subcarrier. The design of a decoding circuit to eliminate residual subcarrier is simplified if a scheme is utilised which is generally insensitive to the presence of residual subcarrier components.

Figure 13:
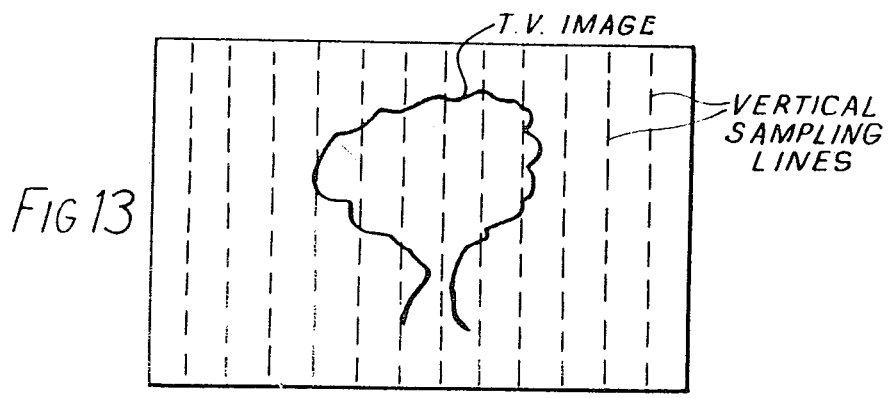
FIG. 13 shows vertical sampling for detecting camera panning.

An alternative movement detection method is shown in FIG. 13 and is useful to detecting horizontal and diagonal camera panning.

A series of sampling points are arranged across the complete television raster. In the diagram shown vertical lines are chosen. The vertical lines are fixed against the television raster and in effect the picture moves behind the vertical lines. Whenever a camera pan takes place all of the vertical sampling points see movement occurring. The detection of movement at all of the vertical sampling points simultaneously indicates that a camera pan is occurring. On detection of panning, the different coefficients can be automatically selected to produce the best subjective effect whenever a large number of the vertical lines sees this movement.

In an alternative movement detection system now to be described a combination of single picture point and area comparison will be used to advantage.

Figure 14:
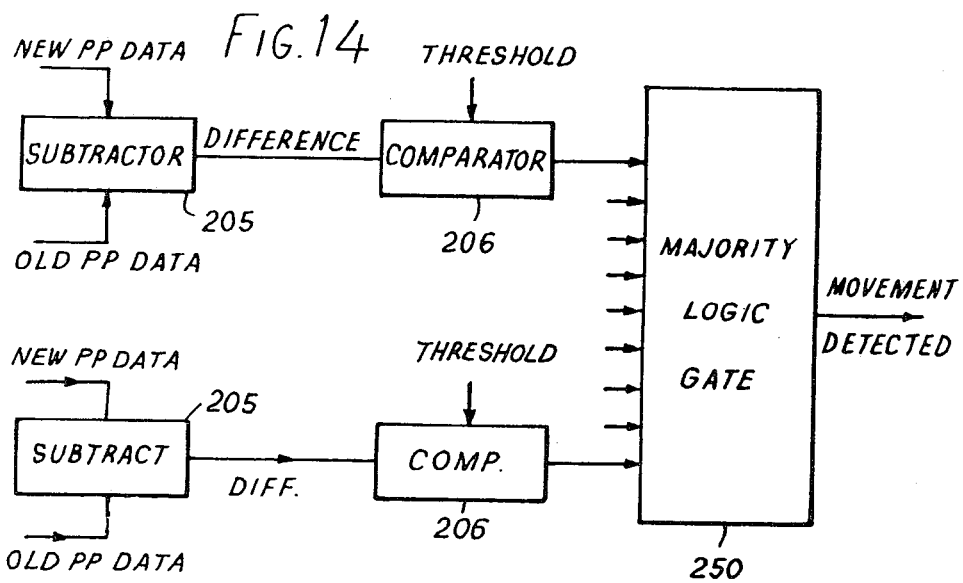
FIG. 14 shows a suitable arrangement for area voting movement detection.

FIG. 12 illustrates an area voting system for movement detection in the presence of noise or residual subcarrier. In this system, each picture point is independently assessed for threshold and a majority logic gate applied to the decision, so that if a proportion of the points are found to have exceeded threshold, movement is signalled to have taken place. In this system, four out of nine is a practical setting to indicate movement. An example of such a system is illustrated in FIG. 14. The difference is provided by the subtractor 205 as before and passes to comparator 206. The output passes to the majority logic gate 250. Only two of the nine inputs to the gate are shown in detail.

A further method of utilising the area voting system does not make use of majority logic. In this method, the total area is integrated, so that the average difference over the area is compared with a threshold. The object is to differentiate between noise and movement. The larger the number of picture points integrated, the closer the noise is averaged towards zero, whereas movement remains unattenuated.

On the other hand, there is a disadvantage of using too large an area due to the emergence of a noise "halo" around moving subjects. The noise "halo" approximates to the size of the area linear dimensions in both the horizontal and vertical axis. It is over that dimension that it becomes impossible to detect the difference between noise and movement utilising the area voting system.

In an effort to increase the detection's system ability to differentiate between noise and movement without increasing the area over which the decision is made, a combination of two fields from each frame to provide the selected portion as an alternative to the above described arrangement have now been utilised. In this way, it becomes possible to double the number of points within the area (volume) close to the picture point and thus attenuate the noise without attenuating the movement.

In practice the combination of point by point detection for large amplitude movement, together with area voting movement detection, provides the best results. The area system is capable of detecting very small changes of tonal quality over an area, such as occurs when skin tones on a face move. The point by point threshold detection system is able to detect an instantaneous single picture point movement of large amplitude such as occurs when a sharp edge transition is present in motion.

Movement detection forms the subject of British patent application No. 31357/77.

Figure 15:
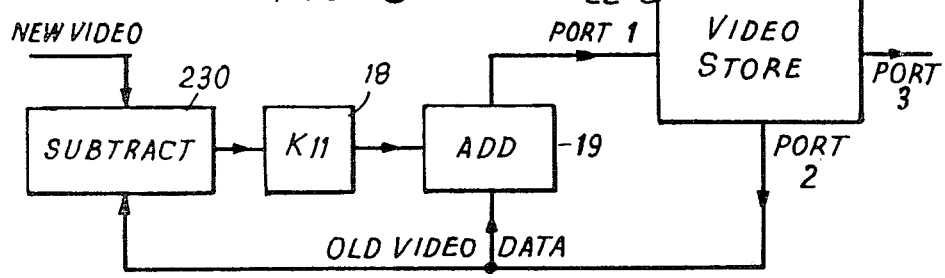
FIG. 15 shows an alternative noise reduction system.

In the noise reduction system described so far three coefficient systems have been used. FIG. 15 shows an alternative method for implementing the noise reduction system to that of FIG. 1, which reduces the multiplier functions to a single unit. The implementation makes use of the general requirement that coefficient k11 is equal to 1 minus coefficient k12 for general purpose noise reduction, i.e.

$$k11 = 1 - k12$$

In this arrangement subtractor 230 receives the new video at one input and the previous video at a second input. The output is modified by coefficient k11 in modifier 18. This output is passed to one input of adder 19 which adds this to the previous data from store 22. In such a scheme the ROM 206 of FIG. 4 will be implemented to provide only one coefficient.

Figure 16:
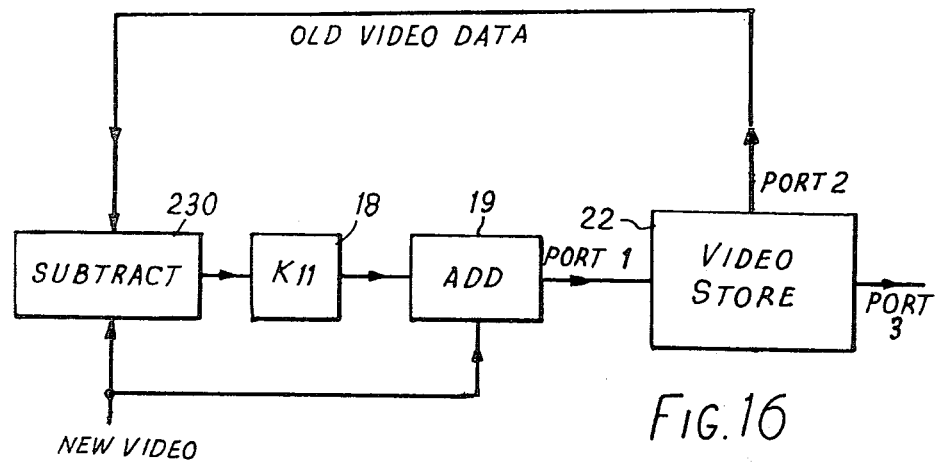
FIG. 16 shows a further system to FIG. 15 also using a single coefficient system.

An alternative noise reduction scheme also using one multiplier (k11) is shown in FIG. 16. The incoming and previous video is received by subtractor 230 and the subtractor output is modified by coefficient k11 in modifier 18 and is added to incoming video in adder 19 before passing to store 22. Thus the provision of a single coefficient system reduces the system complexity and the number of coefficients to be handled.

In the description so far the digital picture information has been described in which no distinction is made between luminance and chrominance information.

Figure 17:
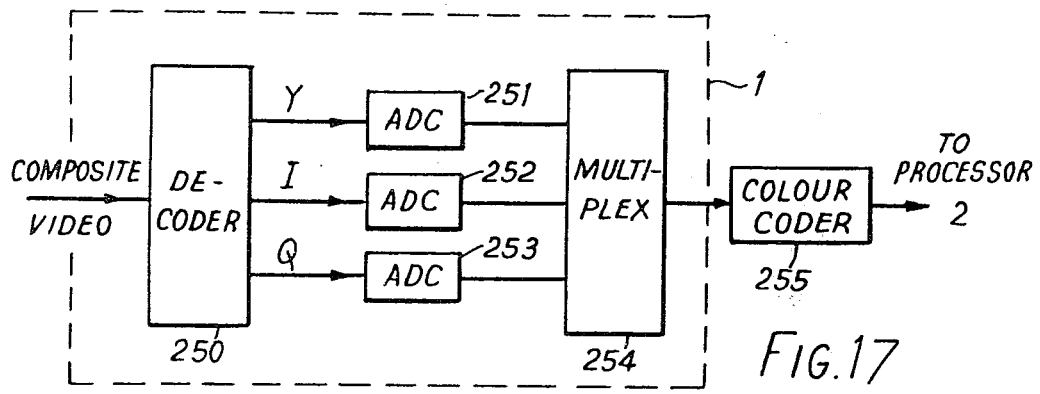
FIG. 17 shows an arrangement for luminance and chrominance coding.

In the arrangement now described with reference to FIG. 17 a code is generated to indicate whether the data is chrominance or luminance information. An input system 1 is also described as an example of how the composite video may be decoded and digitised.

The decoder 250 produces separate signals for luminance and colour differences (Y, I and Q). These are converted into digital form in the converters 251, 252 and 253 then multiplexed in digital multiplexer 254.

The output of the input system 1 passes to the colour code circuit 255. Although coder 255 is shown at this point in the system it could be inserted elsewhere. Once the signal has been digitised it loses its identity and it may be difficult to determine which particular sample relates to Y or I or Q. By providing an additional piece of information (bit) carried along with each digital sample, this identifies the sample as being from either luminance or colour difference information. Thus, whenever a sample is taken from I or Q (the colour difference signals) the colour code bit signifies this occurrence. This allows later circuits to identify the origin of the data sample by reference to the colour code bit.

By providing this identification bit, coefficients k11, K12 and K13 can be altered depending upon the origin of the digital data sample. It is possible to utilise a greater noise reduction for colour difference signals without incurring movement portrayal distortion than may be used for luminance signals.

In principle, two sets of coefficients are stored in the set coefficients unit 25 utilising read only memory (ROM) techniques. Whatever luminance signals are detected the coefficients appropriate to luminance are selected by an examination of the colour code bit in the data word.

Figure 18:
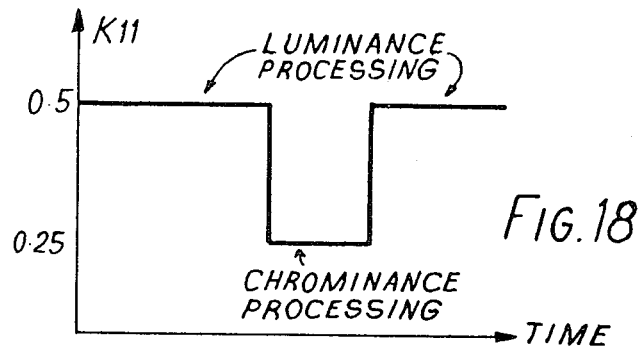
FIG. 18 shows an example of the variation of coefficient K11 in dependence on the colour code.

FIG. 18 shows the diagramatic representation of coefficient k11 when the colour code bit is examined. Only two typical values of k11 are shown. With luminance processing, k11 is set at 0.5. When chrominance processing, k11 is set to 0.25. In this part of the description the assumption is made that k11 remains fixed irrespective of the movement detected in the picture. In practice the level of k11 will vary depending upon the movement detection system described above. Whenever colour difference signals are identified k11 is altered to provide more noise reduction.

Figure 19:
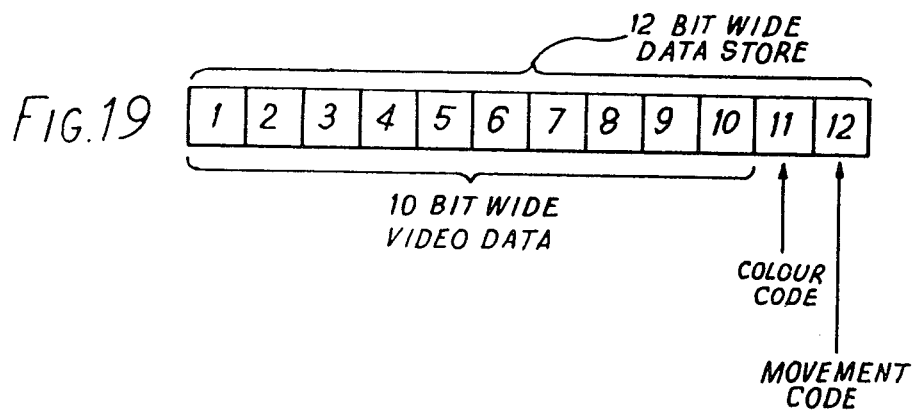
FIG. 19 shows the colour code and movement code carried with the normal video data.

The colour code bit can be carried with the video as shown in FIG. 19. A 12 bit data word system is shown as an example although 10 bits is also possible. The 10 most significant bits carry the video data sample information and the colour code bit may be carried as bit 11. (This could alternatively be carried as bit 12). The other spare bit is shown as comprising the movement code described in relation to the movement detector above.

The arrangements described thus far for implementing the noise reduction system have relied heavily on hardware to implement the system.

The store requires a capacity of 5 to 6 megabits operating at high speed. The input data rate is determined by the television bandwidth and lies between 10 and 20 MHz. Data from ports 2 and 3 are at similar rates.

Processing requires access to picture points surrounding the point to be synthesised. A way to achieve access to picture points is to include a number of stores exactly one line delay long or multiples thereof. The T.V. system structure makes it inconvenient to produce such 1 line stores using standard integrated circuits.

A large number of digital multipliers are required for the system described operating on real time T.V. signals between 10-20 MHz. Implementation of such multipliers may require high power dissipation and is close to the limits of practical technology as it currently exists.

Whilst the above system using the described hardware has been implemented, to reduce its complexity, an alternative arrangement has been devised which includes a computer controlled distributed store and processor. The system now described is highly optimised and can achieve all of the functions described above but in which the hardware arrangement is totally different. The store and processor described form a general purpose solution to the manipulation of television signals under computer control working in real time. This system is in effect a peripheral to a general purpose digital computer which is capable of operating on T.V. signals.

It is anticipated that future developments in video processing lie in the use of software which will steadily increase the scope of the processor and store system which is to be described.

Figure 20:
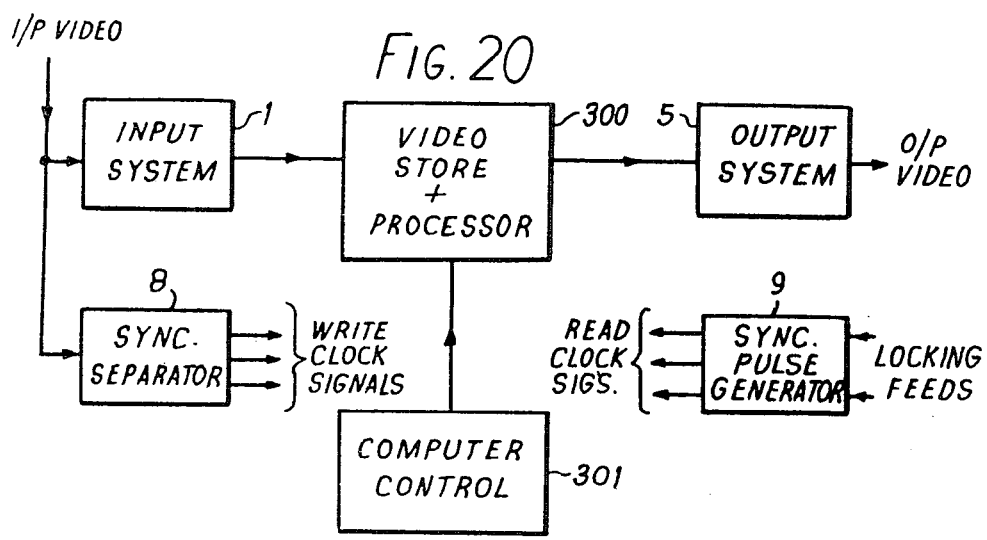
FIG. 20 shows a system where the separate coefficient processing and storage blocks are provided in an integrated store and processor under computer control.

FIG. 20 shows a system using a computer controlled distributed store and processor. The incoming video passes through the input system 1 (ADC etc) to the store and processor 300. The manipulated data passes through the output system 5 (DAC etc) to the system output. The noise reduction system together with any other desired processing is now incorporated within the store and processor system 300 and no longer exist in explicit form.

Once a signal has entered the input port of the store, the signal path it may take is determined by the nature of the distributed processor. The control for the system 300 is provided by computer 301.

The arrangement of the video store and processor will now be described.

Figure 21:
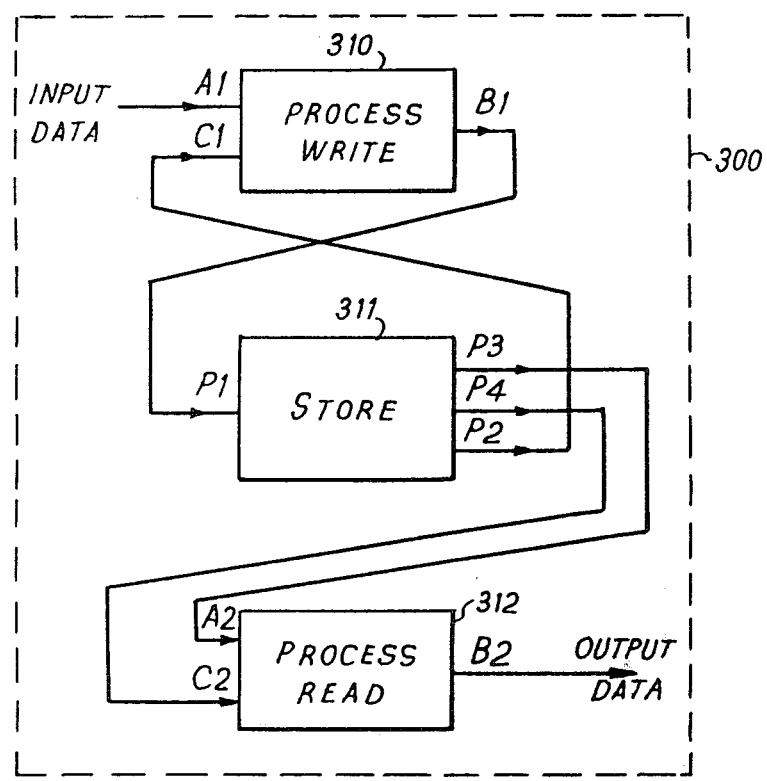
FIG. 21 shows the basic processing function using the system of FIG. 20.

FIG. 21 shows the basic process which is implemented within the distributed system. Input data is applied to one input terminal A1 of a write processor 310. The output from the write processor B1 is applied to the input P1 of a store 311. The output P2 from the store is applied to the third input C1 of the write processor.

Output P3 from the store is applied to terminal A2 of a read processor 312. Output P4 from the store is applied to the C2 terminal of a read processor. The output data from the read processor appears on terminal B2.

During a write cycle the write processor together with the terminals P1 and P2 of the store are active. The store is controlled to provide a cycle called 'Read Modify Write'. This is a standard store cycle which is provided by 16K RAM MOS store integrated circuits.

The write processor undertakes the mathematical expression below:

$$B1 = K1A1 + K2C1 + K3$$

Constants K1, K2 and K3 are set by a write coefficients store and selector system.

During the read process store, connections P3 and P4 together with the read processor are active. P3 and P4 have access to any picture point within the store. An address system identifies the picture point which will be used. The read processor undertakes a mathematical expression below:

$$B2 = K4A2 + K5C2 = K6.$$

Coefficients K4, K5 and K6 are set by a read coefficients selector system.

The read process and the write process may occur asynchronously. The access of P1, P2, P3 and P4 may be any point within the picture.

Utilising the processor function described above it is possible to adjust the coefficients K1 through K6 to undertake all of the functions which have been described above including noise reduction. The computer is used to address the store and to set the coefficients which are to be used. A suitably designed computer programme allows this operation to be undertaken. No restriction is placed by the system upon clock speed at the input relative to the output.

Figure 22:
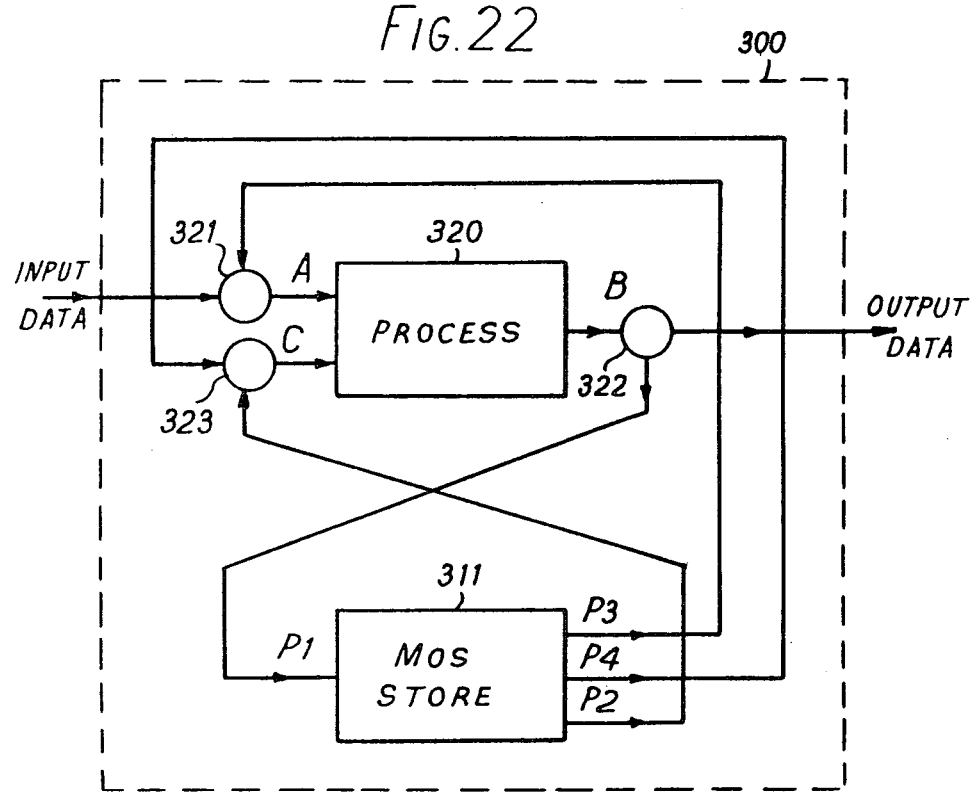
FIG. 22 shows a minimum system for processing including a single processor and store.

In the description of the basic process shown in FIG. 21 it is clear that the write process occurs at a different time from the read process. It is possible therefore to combine the write processor and the read processor into one function without sacrificing speed. The system shown in FIG. 22 is the minimum system capable of undertaking the processes needed to implement all of the functions described. A single processor 320 is multiplexed with digital switches to act first of all during the write cycle—Read Modify Write—and then during the read cycle. The processor undertakes a mathematical function below:

$$B = K1A + K2B$$

In practice a large number of the functions may be undertaken utilising a special value for K1 equal to 1 minus K2.

Digital switches 321, 322 and 323 are provided to select the data paths. During the write cycle the input video is connected to terminal A of the processor. Terminal B is connected to input P1 of the MOS store 311. Terminal P2 of the MOS store is connected to the terminal C of the processor.

During a write cycle the terminal P3 is connected to processor terminal A. Terminal P4 is connected to terminal C of the processor. The output video is taken from terminal B of the processor. The coefficients K1 and K2 are altered according to whether a read cycle or a write cycle has been selected. The digital switches 321, 322 and 323 at terminals A, B and C respectively may be logical gates or tristate switches in practice. The MOS store need only have one input and one output together with a method of routing the data to the required terminals A and C of the processor.

Figure 23:
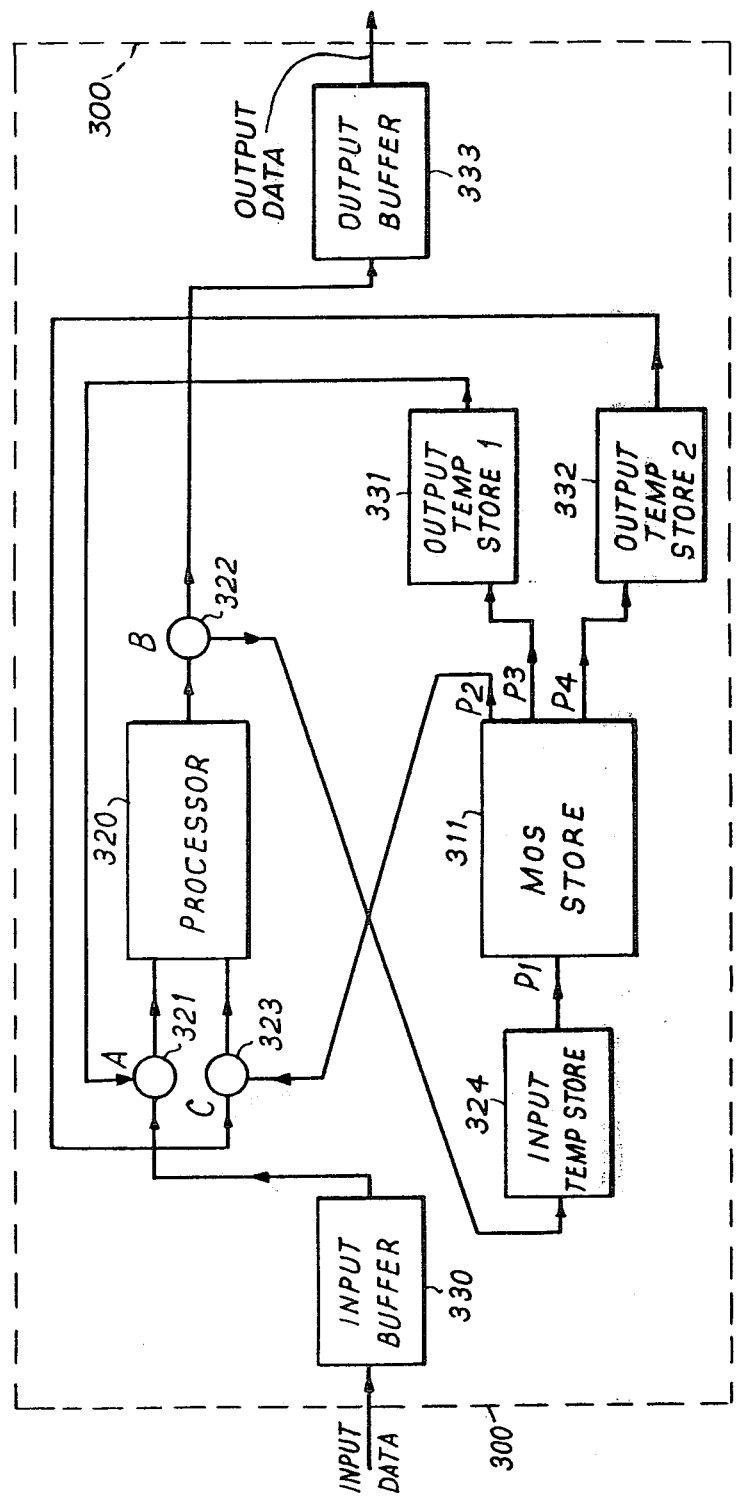
FIG. 23 shows an arrangement for effecting the distributed store and processor of FIG. 20.

A practical arrangement of the distributed store and processor is shown on FIG. 23. Input video is stored in the input buffer 330. In a practical circuit the input buffer has a capacity of 16 words each of which is 10 or 12 bits long. The processor 320 is connected to the various sources and supplies of data signals by tristate switches 321, 322 and 323. Users of logic circuits will be aware that tristate switches do not include an explicit switch function.

The processor has a capacity for multiplying 12 bit digital words by 4 bit digital words. The output from the processor is stored in a temporary store 324. The MOS store takes the form of standard 16K integrated circuits which are random access memory (RAM) devices. Output ports P2, P3 and P4 do not explicitly exist but are used to illustrate the use of the various parts of the circuit. During a write cycle the output from the MOS store is connected to terminal C of the processor. During a read cycle the output from the MOS store is applied first to a temporary store 331 and then to a second temporary store 332. During a read cycle the contents of temporary stores 331 and 332 are applied to the terminals A and C of the processor function. The output from the processor function at terminal B is connected via tristate logic to the output buffer 333. The output buffer is a store which will typically store 16 words 10 or 12 bits long.

Figure 24:
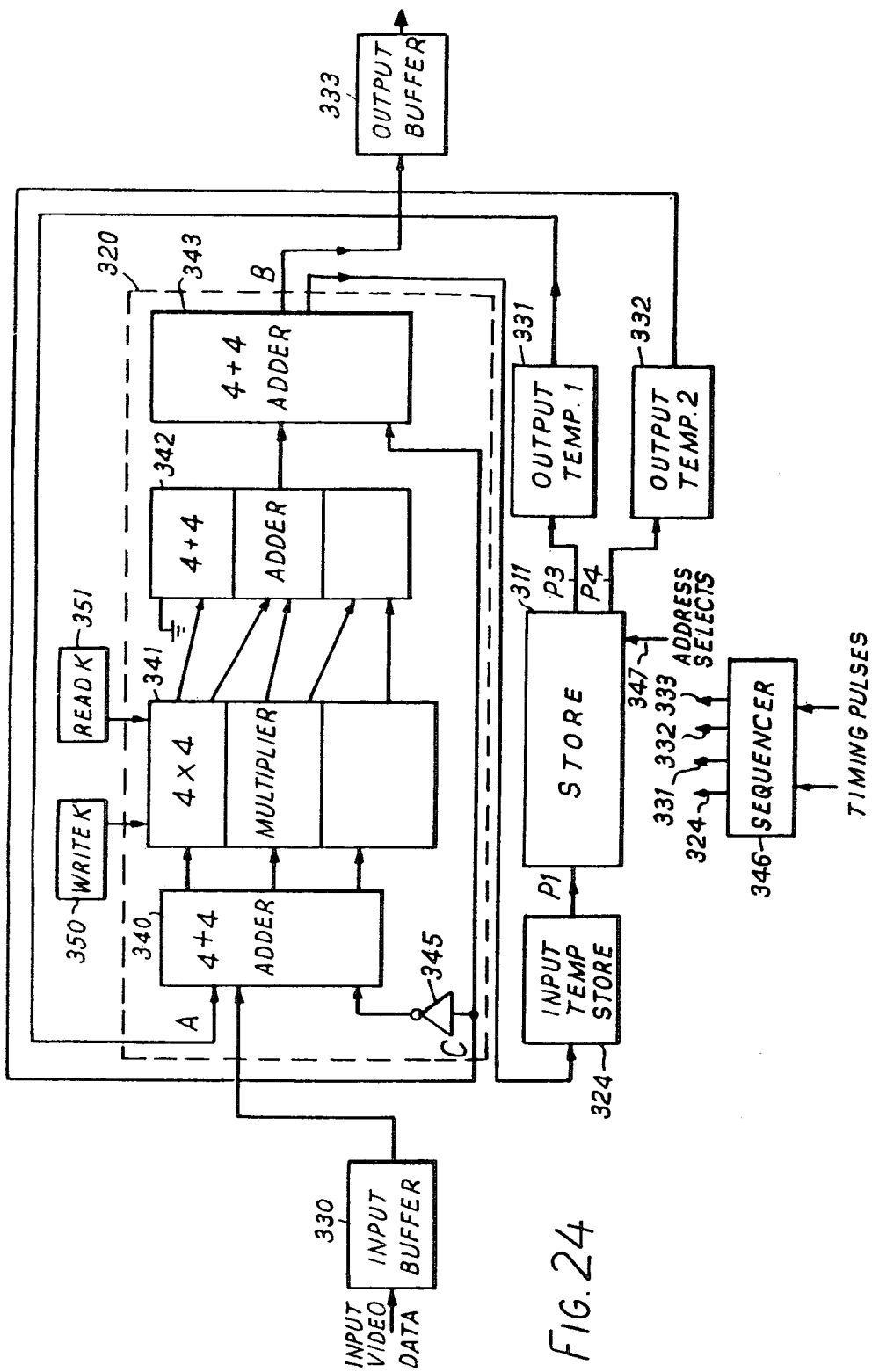
FIG. 24 shows the processor and storage system of FIG. 23 in more detail.

FIG. 24 shows the store and processor arrangement in more detail. The arrangement now described would be 1 of 16 identical circuits required to provide the necessary capacity (i.e. FIG. 24 can be provided on 1 card, a total of 16 such cards being required).

The input buffer 330 can comprise 3 integrated circuit chips type 74LS670 to provide the necessary bit handling.

The buffer output goes to the input A of adder 340 of processor 320. The adder is constructed from 3 chips each of 4×4 bits (e.g. type 74LS283). The input A is also connectible with the output of temporary store 331. Input C of the processor is connected to the other input of adder 340 via inverters 345 (e.g. type 7404). The output from adder 340 is received by te 'Wallace Tree' multiplier arrangement comprising multiplier block 341 and adder 342. Block 341 comprises three 4×4 multipliers (e.g. 74S274) which have outputs connected in Wallace Tree configuration to the adder 342 comprising three 4+4 adders as above. The output from the block 342 is connected to adder 343 which again comprises three 4+4 bit adders. The other input to the adder is from C. The adder output is processor output B which passes either to output buffer 333 (3×74LS670) or to the input temporary store 324 (4×74LS174). The store 311 is constructed from 22 chips sharing common addressing 347. The input to each chip is received from a specific location in the temporary store 324. The output from each chip of the store is accesible via the temporary stores 331, 332. Each of the 22 chips of the store is a 16K RAM (e.g. MK4116). Addressing, writing and reading data into and out from such an integrated circuit RAM is well known. The temporary output store 331 has its output available to terminal A of the processor and output store 332 has its output available to terminal C of the processor.

Storage of coefficients for the multiplier during a write cycle is undertaken by block 350 (e.g. 825184) and during a read cycle by block 351 (e.g. 74LS670). The coefficient stores 350, 351 store several values of K which may be selected by the computer control and the system control. Sequencer block 346 (e.g. 74LS138) provides sequencing for the various temporary stores and buffers during the operation cycle under control of the timing pulses produced externally to the store. The way in which the computer can be interfaced and gain access to the addressing and control circuits of the video store has been previously described in the video processing system described in British patent application No. 3731/76 (U.S. Ser. No. 764,617).

Figure 25:
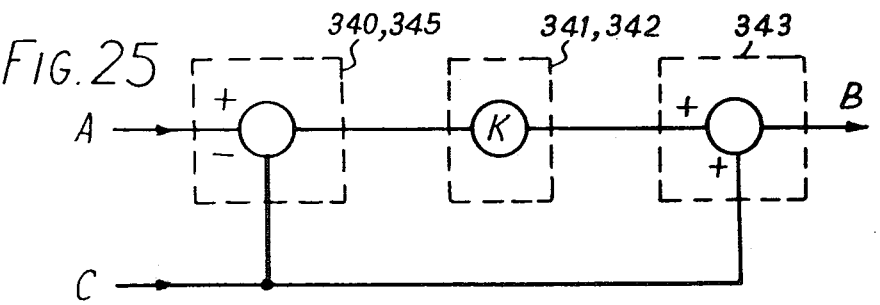
FIG. 25 shows processing function of the processor elements of FIG. 24.

The processor function produced by the FIG. 24 arrangement is shown in FIG. 25. First adding function is effected by 340, 345, then multiplication by the coefficients K by 341, 342 and the final adding function by 343.

Figure 2:
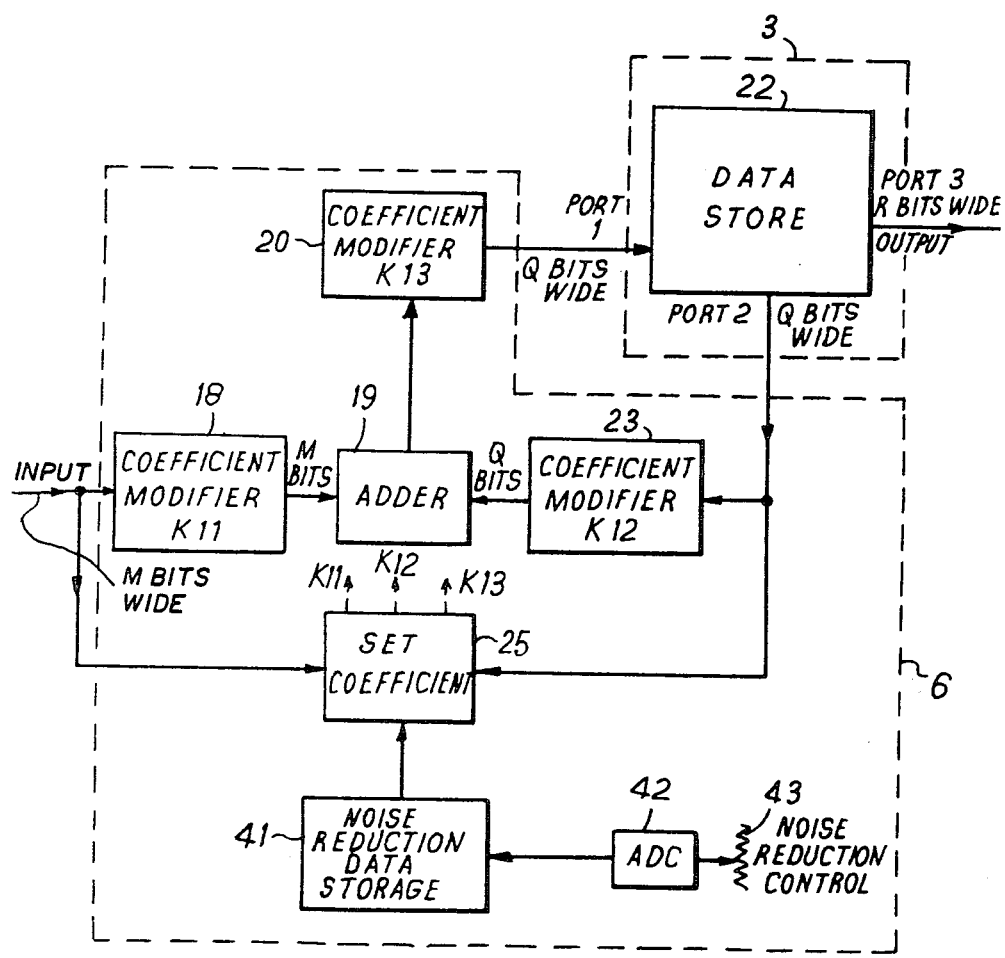
FIG. 2 shows the system of FIG. 1 in more detail.

Alternatively in the system of FIG. 2 for example digital microprocessors could be used to calculate the required coefficients and control the coefficient look-up tables.

We claim:

1. A video noise reduction system for incoming video information derived from a plurality of picture points, said system comprising:
    coefficient modifier means for modifying at least a portion of the incoming picture point information;
    video storage means for storing the modified picture point information;
    adder means for adding at least a portion of the stored picture point information to at least a portion of corresponding picture point information from an incoming field to provide noise reduced picture point information at the store output; and
    control means for adjusting the degree of modification effected by the coefficient modifier means in dependence on whether luminance or chrominance components are present when picture movement is occuring.

2. A system according to claim 1 wherein first coefficient modifier means are provided at the system input prior to the adder means, for receiving the incoming video information; second coefficient modifier means are provided between the adder means and the storage means input and feedback means are provided between an output of the store and the adder, each of the modifier means being capable of modifying the picture point information passing therethrough.

3. A system according to claim 2 wherein said feedback means includes a third coefficient modifier means.

4. A system according to claim 1 wherein subtractor means are provided for subtracting the stored video information from the incoming video.

5. A system according to claim 4 wherein the subtractor means are provided prior to the coefficient modifier means.

6. A system according to claim 4 wherein the adder means is provided between the coefficient modifier means and the store input to add the modifier means output to the stored video information.

7. A system according to claim 4 wherein the adder means is provided between the coefficient modifier means and the store input to add the modifier means output to the incoming picture point information.

8. A system as claimed in claim 1 wherein said video storage means comprises a three port system, a first port comprising the store input, a second port providing an output for feedback information and a third port for providing an output for noise reduced information.

9. A system according to claim 1 wherein the modifier means comprises a multiplier and said control means comprises a memory, said memory being capable of storing at least one value of the coefficient to be used in said multiplier to effect real time multiplication.

10. A system according to claim 9 wherein the memory has a plurality of locations for storing a coefficient to provide a variable amount of noise reduction in dependence on the coefficient selected.

11. A system according to claim 10 wherein a movement detector is provided for controlling the coefficient selected to reduce the amount of noise reduction in dependence on the detected movement.

12. A system according to claim 11 wherein the movement detector includes a subtractor for detecting any difference between at least one picture point of the incoming and stored video information.

13. A system according to claim 12 wherein the memory is connected to the subtractor of the movement detector to provide a value of the coefficient in dependence on the difference detected between the picture points.

14. A system according to claim 12 wherein the movement detector includes an integrator for detecting movement in the presence of noise.

15. A system according to claim 12 wherein the movement detector includes an area voting system for indicating movement when a number of picture points within the area indicate movement.

16. A system according to claim 11 wherein the movement detector includes a movement code generator for producing a movement code which can accommpany the video information passing through the system.

17. A system according to claim 9 wherein the multiplier comprises a read only memory.

18. A system according to claim 1 wherein a colour code generator is provided adjacent the system input for generating a code in dependence on whether luminance or chrominance components are present to enable said control means to provide variation of a coefficient for said coefficient modifier means to be effected whenever a change in the code is detected.

19. A system according to claim 1 wherein the storage means, coefficient modifier means, control means and the adder means are contained within an integrated video store and processor accessible by a computer.

20. A system according to claim 19 wherein the video store comprises a number of random access memories and the processor includes digital adders and multipliers and includes buffer storage to enable processing to be shared by common processors.

21. A system according to claim 19 wherein coefficient holding means are provided which hold coefficients accessible by the computer.

22. A method of reducing noise contained in video picture point information comprising:
    modifying at least a portion of the incoming information; adjusting the degree of modification in dependence on whether luminance or chrominance components are present, when picture movement is occuring, storing the video information and adding at least a portion of the stored information to the incoming information to provide a reduction in the noise thereon after said adding step.

23. A method according to claim 22 including the step of modifying both the incoming and stored information prior to addition and effecting a further modification prior to storage.

24. A method according to claim 22 including the step of subtracting the incoming and stored information prior to the modifying step.

25. A method according to claim 24 wherein the stored data is added to the information provided by the modifying step.

26. A method according to claim 24 wherein the incoming data is added to the information provided by the modifying step.

27. A method according to claim 22 wherein the modifying step includes multiplying the information by a selected coefficient.

28. A method according to claim 27 including the step of detecting movement between at least one picture point to vary the selected coefficient in dependence on detected movement.

29. A method according to claim 28 including detecting movement between a number of picture points from different picture fields.

30. A method according to claim 22 including generating a movement code for controlling the degree of noise reduction.

31. A method according to claim 22 including generating a code signal indicative of whether luminance or chrominance components are present on incoming information to enable the degree of modification to be effected whenever the code changes.

* * * * *